G. W. JESSUP.
POTATO DIGGER.
APPLICATION FILED DEC. 24, 1908.
952,200.
Patented Mar. 15, 1910.
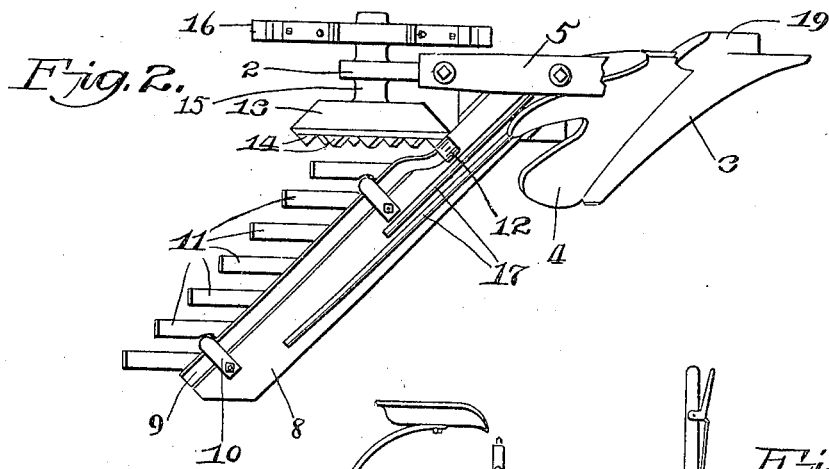
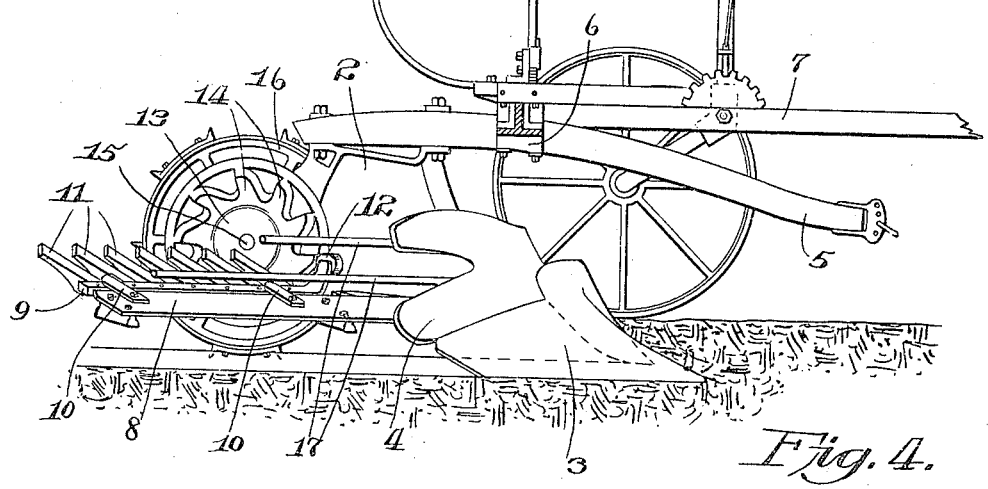
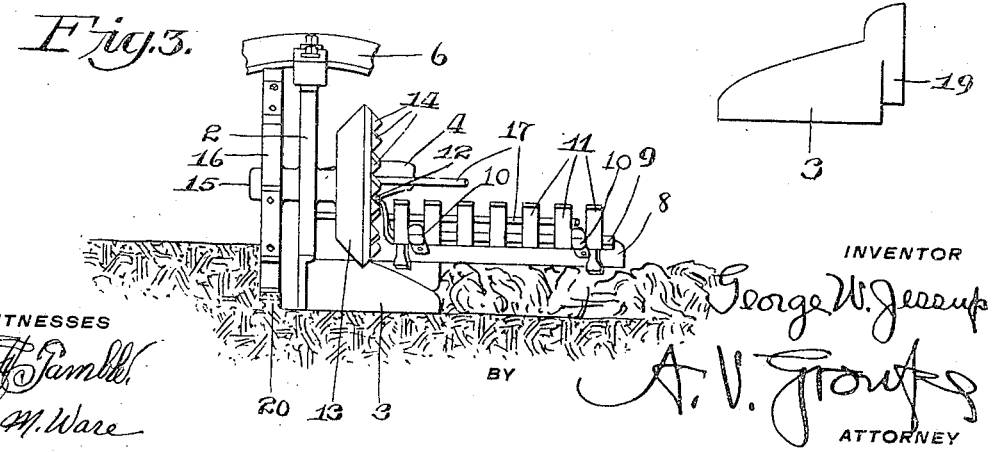
WITNESSES
INVENTOR
George W. Jessup
BY
A. V. Grouts
ATTORNEY

UNITED STATES PATENT OFFICE.

GEORGE W. JESSUP, OF MOORESTOWN, NEW JERSEY.

POTATO-DIGGER.

952,200. Specification of Letters Patent. Patented Mar. 15, 1910.

Application filed December 24, 1908. Serial No. 469,116.

*To all whom it may concern:*

Be it known that I, GEORGE W. JESSUP, citizen of the United States, and resident of Moorestown, in the county of Burlington and State of New Jersey, have invented certain new and useful Improvements in Potato-Diggers, of which the following is a full, clear, and exact description.

This invention relates to potato diggers, the object being to provide a simple and efficient construction and organization of mechanism whereby the ground containing the potatoes may be plowed and the potatoes separated from the plowed ground, as will be hereinafter fully described and particularly pointed out in the claims.

In the drawings:—Figure 1 is a side elevation of my improved potato digger, partly shown in section. Fig. 2 is a plan view of a portion of the plow beam and plow, and the parts of the mechanism carried thereby. Fig. 3 is a rear view of the parts shown in Fig. 2, including a part of the cross-bar of the sulky for carrying the mechanism. Fig. 4 is a front elevation of the plowshare.

2 designates a plow standard to the lower, forward portion of which are secured a plowshare 3 and mold-board 4, the mold-board 4 being located above the plowshare, as is usual. The plow standard 2 is carried by the plow beam 5 of usual construction, which is secured to and carried by the cross bar 6 of the plow sulky 7.

The construction and operation of the plow sulky 7 are common and well known in this art, and no detailed description or illustration thereof is deemed necessary herein. It may here be remarked that the plow sulky 7 may be dispensed with and the usual rearwardly extending plow handles applied to the plow for the purpose of guiding and controlling the course of the plow.

Extending laterally from the plow standard 2 is a frame 8 along the rearward edge of which extends a horizontal bar 9 which is mounted to rock in bearing blocks 10 which are secured to the frame 8. The bar 9 is provided with projections 11, which extend rearwardly from the frame 8 in spaced relation to each other, for a purpose hereinafter explained. One end of the bar 9 extends upwardly and carries a roller 12 which engages a cam wheel 13 provided with suitable cam projections 14. The bar 9, projections 11 and rollers 8 are so disposed with relation to each other and to the cam wheel 13 that the weight of the projections 11 will maintain the roller 12 in engagement with the cam wheel 13 and cause it to enter the spaces between the cam projections 14 during the rotation of the cam wheel 13. The cam wheel 13 is secured to one end of a rotatable shaft 15 which extends through a suitable bearing on the plow standard 2. To the other end of the shaft 15 is secured a wheel 16, the periphery of which is provided with projections adapted to engage the ground and rotate the wheel during the forward movement of the potato digger.

Arranged directly above the forward edge of the frame 8 and in spaced relation to each other are rods 17 which project outwardly from the plow standard 2 parallel to the frame 8 and directly in rear of the mold-board 4; the purpose of these rods will be hereinafter explained.

The plowshare 3 is of usual construction, excepting that the body portion thereof is provided with a lateral projection 19, which extends from the body of the plowshare toward the land side; that is to say, the side of the plowshare next adjacent the land or ground from which it is cutting the furrow. The bottom of the projection 19 is located above the bottom of the plowshare 3 and below the top of the ground from which the furrow is being cut. It will therefore be seen that a shoulder or ledge of ground (as at 20, Fig. 3) will remain in the land side of the furrow between the top and bottom thereof. The bottom of the wheel 16 is in the same horizontal plane with the bottom of the projection 19 of the plowshare 3, and the wheel 16 is in line with and directly in rear of the projection 19. It follows therefore that the wheel 16 and the projections thereon during the forward movement of the potato digger, will roll upon the ledge 20 cut by the projection 19.

The operation may be briefly described as follows:—The plow is advanced through the ground in the usual manner, and the ground containing the potatoes is plowed thereby. During the forward movement of the plow the wheel 16 rolls upon the ledge 20 and is rotated thereby. The rotation of the wheel 16 causes the shaft 15 and cam wheel 13 to rotate also, and during the rotation of the cam wheel 13 the engagement of the roller 12 with the cam projection 14 causes a rapid shaking or up-and-down movement of the bar 9 and its projections 11; that is, as the cam projections 14 and the spaces therebetween pass the roller 12, the roller is forced outwardly from the center of the wheel 13 by the projections 14, and is permitted to move toward the center of the wheel 13 by the spaces between the cam projections 14. Thus the bar 9 and its projections 11 are raised by the action of the cam projections 14 and are permitted to fall by the spaces between the cam projections. As each successive furrow is cut by the plow, the ground cut from the furrow and containing the potatoes is directed by the plow-share 3 and mold-board 4 to fall upon the laterally extending frame 8 and the projections 11 extending rearwardly therefrom; and the ground, falling upon the frame 8, encounters the rods 17 and is partially broken thereby. The partially broken ground is now acted upon and ejected by the shaking or rapid up-and-down movement of the projections 11, the effect of which is to break up the ground and separate the potatoes therefrom, the broken ground falling between the projections 11 and the potatoes being retained by the projections and discharged from the rear ends thereof while the broken ground falls between the projections, thus leaving the potatoes exposed upon the plowed and broken ground in the path traversed by the digger.

I claim:

1. In a potato digger, the combination of a plow standard, a plowshare, a mold-board, a frame extending from the standard adjacent the mold-board and above the bottom of the plowshare and laterally and rearwardly and at an angle with respect to the land side of the plow share, a rocking bar carried by said frame, a series of rearwardly-extending projections carried by said bar, and means for rocking said bar.

2. In a potato digger, the combination of a plow standard, a plowshare, a mold-board, a frame extending from the standard adjacent the mold-board and above the bottom of the plow share and laterally and rearwardly and at an angle with respect to the land side of the plow share, a rocking bar carried by said frame, a series of rearwardly-extending projections carried by said bar, a wheel positioned to engage the ground during the movement of the digger, and means operated by said wheel for rocking said bar.

3. In a potato digger, the combination of a plow standard, a plowshare, a mold-board, a frame extending from the standard adjacent the mold-board laterally and rearwardly and at an angle with respect to the land side of the plow share, a rocking bar carried by said frame, a series of rearwardly-extending projections carried by said bar, a rotatable shaft, a wheel on said shaft and positioned to engage the ground during the movement of the digger, a cam wheel on said shaft, having cam faces arranged on an incline with respect to the plane of movement of the wheel, and a roller on said bar and engaging said cam wheel.

4. In a potato digger, the combination of a plow standard, a plowshare, a mold-board, a frame extending laterally from the standard adjacent the mold-board, a rocking bar carried by said frame, a series of rearwardly extending projections carried by said bar, means for rocking said bar, and rods located above said frame in spaced relation to each other.

5. In a potato digger, the combination of a plow standard, a plowshare having a lateral projection extending from the body of the plowshare toward the land side above the bottom of the plowshare, a wheel in rear of and in line with said projection, the bottom of said wheel being substantially on the same horizontal plane with the bottom of said projection, and ground-breaking mechanism operated by said wheel.

6. In a potato digger, the combination of a plow standard, a plowshare having a lateral projection extending from the body of the plowshare toward the land side above the bottom of the plowshare, a mold-board, a frame extending laterally from the standard adjacent the mold-board, a rocking bar carried by said frame, a series of rearwardly-extending projections carried by said bar, a wheel in rear of and in line with said projection, the bottom of said wheel being substantially on the same horizontal plane with the bottom of said projection, and means operated by said wheel for rocking said bar.

7. In a potato digger, the combination of a plow standard, a plowshare having a lateral projection extending from the body of the plowshare toward the land side above the bottom of the plowshare, a mold-board, a frame extending laterally from the standard adjacent the mold-board, a rocking bar carried by said frame, a series of rearwardly-extending projections carried by said bar, a rotatable shaft, a wheel on said shaft, said wheel being in rear of and in line with said projection, the bottom of said wheel being substantially on the same horizontal plane with the bottom of said projection, a cam wheel on said shaft, and a roller on said bar and engaging said cam wheel.

8. A plowshare having a lateral projection extending from the body of the plowshare toward the land side above the bottom of the plowshare.

In testimony whereof, I have hereunto affixed my signature.

GEORGE W. JESSUP.

Witnesses:
  WM. J. LOVELL,
  W. HENRY JONES.